Feb. 13, 1934.  F. BAUER ET AL  1,947,075

DRY RECTIFIER

Filed April 2, 1931

WITNESSES:
Q.J. Fitzgerald
R. W. Bailey.

INVENTORS
Friedrich Bauer &
Eduard W. Kafka
BY
ATTORNEY

Patented Feb. 13, 1934

1,947,075

UNITED STATES PATENT OFFICE 1,947,075

DRY RECTIFIER

Friedrich Bauer and Eduard Wilhelm Kafka, Berlin-Charlottenburg, Germany, assignors to Westinghouse Electric and Manufacturing Company, a corporation of Pennsylvania Application April 2, 1931, Serial No. 527,140, and in Germany April 4, 1930

1 Claim. (Cl. 175—363)

Our invention relates to dry rectifiers and more particularly to dry-rectifier installations with a finely graded regulation.

For many industrial purposes, the use of direct current cannot be avoided. That is particularly the case in workshops of the refining industry, operating with electrolytic baths. For that kind of work, it is necessary to regulate the voltage of the direct current in fine steps. A simple manner of reducing the voltage in a circuit is to insert resistors in series with same, but that method is uneconomical owing to the dissipation of energy in the resistors.

The object of our invention is to provide an arrangement for regulating the voltage of a dry-rectifier installation in a finely-graded, continuous manner. This is achieved according to our invention by inserting in series with the dry rectifiers a transformer or a choke coil, the voltage of which can be regulated in a manner known per se by varying the magnetic permeability of the path of the lines of force.

In the drawing, Figure 1 is a diagram illustrating circuit connections embodying one modification of our invention;

Figure 1:
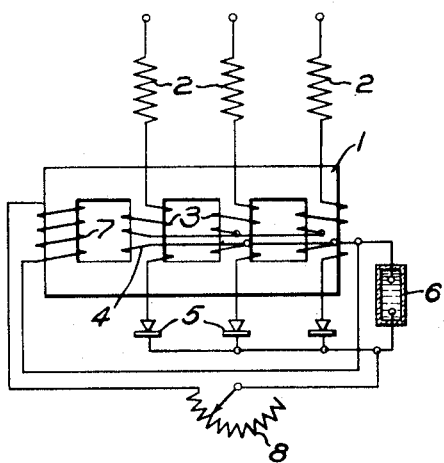

In Fig. 1 the method of connection of an installation of that kind is shown by way of example. 1 indicates the transformer, 2 are series choke coils, 3 is the high-tension winding of the transformer. The dry rectifiers 5 are connected to the low-tension winding 4. Into the circuit of the rectifier is inserted a consumer, for example, an electrolytic bath 6. With the connections according to Fig. 1, the regulation of the magnetic field is produced by there being provided, in addition to the alternating-current windings, a winding 7 fed with regulable direct current.

The pre-magnetization by means of direct current effects that the alternating field can only develop in a weaker degree, owing to the already existing saturation. The magnetizing current taken by the primary side consequently becomes much stronger and already produces a great voltage drop in the series choke coils. By means of the regulator 8, the direct current through which the pre-magnetization of the transformer is produced, can be easily regulated.

It is advisable to provide the transformer with one or more legs in addition to those carrying the alternating-current windings. The direct-current winding 7 is then wound round one of the additional legs of the transformer 1.

Figure 2:
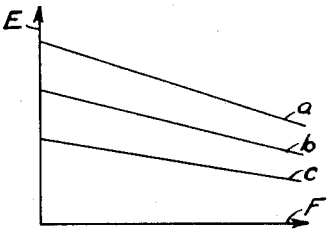
Fig. 2 is an explanatory diagram referred to in connection with Fig. 1.

Fig. 2 shows the characteristic curves of the rectifier fed from the above described transformer. The curves $a$, $b$ and $c$ represent the voltage on the direct-current side in relation to the load current for various degrees of pre-magnetization.

The magnetic field may, of course, also be varied by providing in the transformer, instead of the direct-current magnetization, a variable air gap, the size of which is capable of being adjusted. The magnetic field varies with the size of the air gap. By adjusting the gap any desired voltage curves can be obtained, similar to those in Fig. 2.

The arrangement may also be modified in such a manner that a normal three-phase transformer is employed and a regulable choke coil is connected in series with same. The regulation of the choke coil is effected with the same means as those applied in connection with the above described transformer. The altering of the magnetic permeability of the path of the lines of force is, therefore, in this case also effected either by regulating the direct-current pre-magnetization or by varying an air-gap.

Figure 3:
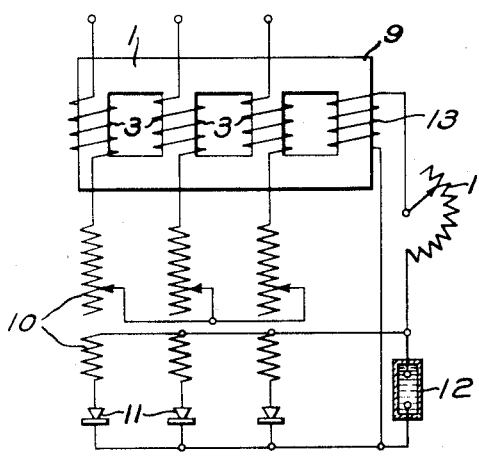
Fig. 3 is a diagram of circuit connections embodying another modification of our invention; and, Fig. 4 is an explanatory diagram.

As in the case of the above described transformer, the choke coil is also provided with one or more additional legs, the direct-current winding or the air gap being arranged on, or in, respectively, the additional core. The diagram of connections of an arrangement of the latter kind is shown in Fig. 3. In same, 9 indicated the choke coil, 10 the transformer. The dry rectifiers 11 supply the current for an electrolytic bath 12. The currents in the direct-current winding 13 may be regulated by the regulator 14.

Figure 4:
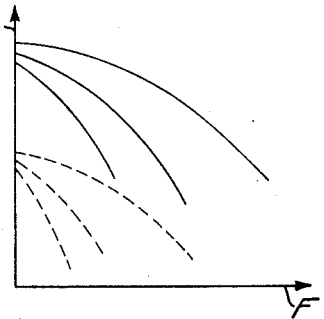

The characteristic curves obtained by connecting a choke coil before the transformer and in series with same are shown in Fig. 4. Here again, the voltage of the rectifier is plotted in relation to the load current for various degrees of pre-magnetization, or to the size of the air-gap, respectively.

The principal advantage of our invention with the described arrangements is that the latter are particularly suitable for small consumers. The combination of the transformer regulated by direct-current pre-magnetization, with a rectifier, enables the alternating voltage to be regulated, without a separate direct-current source being necessary.

We claim as our invention:—

A rectifier system comprising a reactor having a plurality of legs, a polyphase alternating current input circuit having coils on the legs except one of said reactor, inductance means in series with said alternating current input circuit, an output circuit connected to said reactor, rectifying means in series with said output circuit, and means in shunt with said output circuit for finely varying the degree of saturation of the magnetic circuit of the reactor comprising a direct current coil on the leg of said reactor that does not have an alternating current coil thereon and means for regulating the value of the direct current through said coil.

FRIEDRICH BAUER.
EDUARD WILHELM KAFKA.